United States Patent

Cantwell

[15] 3,702,461

[45] Nov. 7, 1972

[54] DISK FILE GIMBAL HEAD MOUNT

[72] Inventor: Gill Cantwell, Los Angeles, Calif.

[73] Assignee: Century Data Systems, Inc., Anaheim, Calif.

[22] Filed: May 19, 1971

[21] Appl. No.: 144,903

[52] U.S. Cl. ....................... 340/174.1 E, 179/100.2 P

[51] Int. Cl. ................................................ G11b 5/60

[58] Field of Search ................. 340/174.1 E, 174.1 F; 179/100.2 CA, 100.2 P

[56] References Cited

UNITED STATES PATENTS

| | | | |
|---|---|---|---|
| 3,609,721 | 3/1971 | Meneley | 340/174.1 E |
| 3,599,193 | 8/1971 | Cote et al. | 340/174.1 E |
| 3,581,298 | 5/1971 | Billawala | 340/174.1 E |

*Primary Examiner*—Vincent P. Canney

*Attorney*—John A. Duffy and Bruce D. Jimerson

[57] ABSTRACT

A rigid frame and gimbal spring may be utilized to form a hybrid gimbal arrangement for mounting a disc file head. Such a configuration will permit both normal loading and free rotation of the head about axes parallel with surface of the rotating disc.

5 Claims, 3 Drawing Figures

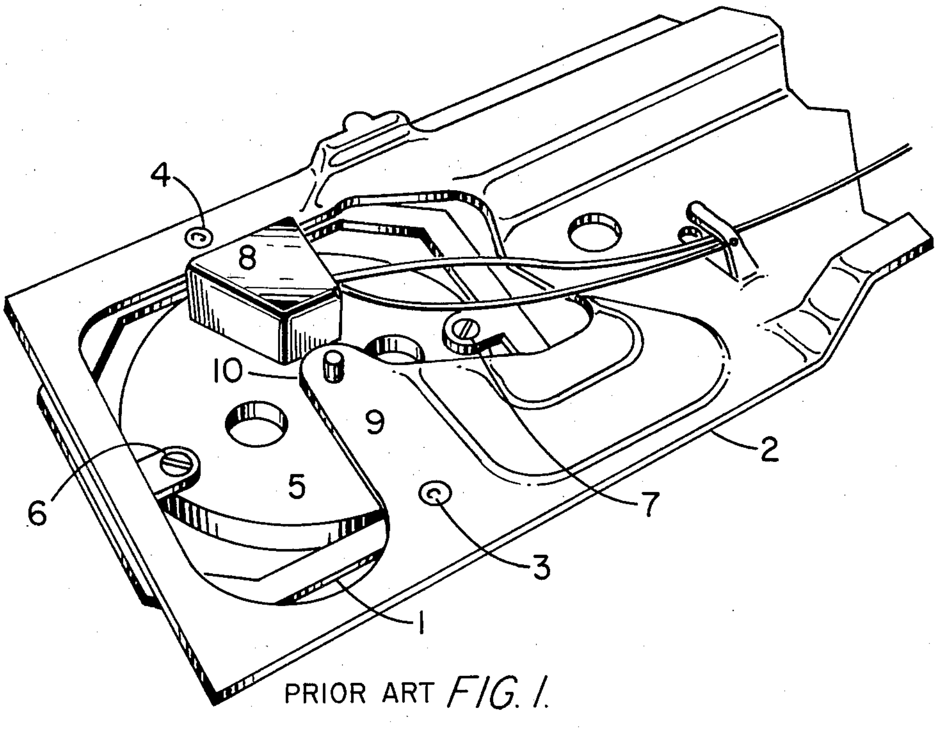
PRIOR ART FIG. 1.
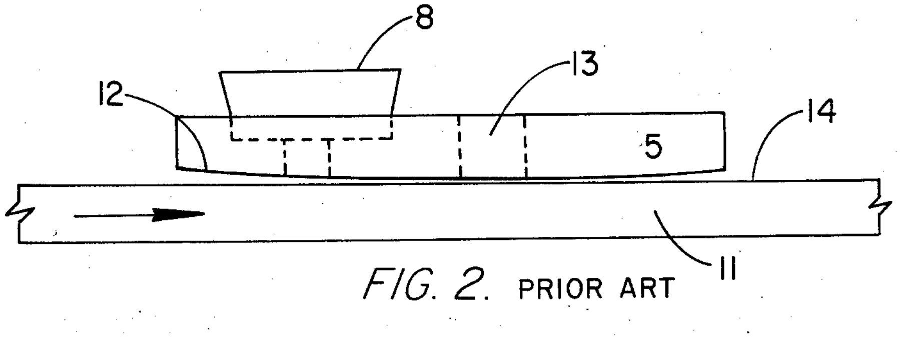
FIG. 2. PRIOR ART
INVENTOR.
GILL CANTWELL
BY
BRUCE D. JIMERSON
ATTORNEY

INVENTOR.
GILL CANTWELL
BY
BRUCE D. JIMERSON
ATTORNEY

DISK FILE GIMBAL HEAD MOUNT

BACKGROUND OF THE INVENTION

A typical disc file memory comprises a rotating disk and a read/write head which is positioned relative to a pre-established track on the surface of the disk by means of an arm. The head must be accurately positioned relative to the track and be mounted on the arm so as to allow freedom for angular rotation about two axis which will permit the head to assume the same plane as the disc surface. In addition, the mounting arrangement must be capable of supplying a force to the head in a direction which is normal to the surface of the disc. Conventional mounting arrangements achieve these requirements by utilizing a thin diaphram coupling between the head and the arm—with the diaphram plane being parallel to the disc plane. Portions of the diaphram are usually "cut-away" so as to minimize rotational stiffness. The force normal to the surface of the disc is applied by a structural member which extends half way across the head so as to contact it approximately at its "roll center."

While the prior art mounting systems are adequate for many applications, they have certain disadvantages. Where a number of discs are stacked to obtain large capacity memories, the physical dimensions of the mounting system become a limitation on how close the discs can be stacked. In addition, the prior art systems concentrate the entire vertical stress on a small area. Furthermore, the transmitted force for a given arm movement will depend upon the rigidity of the structural member which contacts the head. Since this rigidity is dependent upon the cross sectional dimensions of the member, it is sometimes difficult to obtain the requisite loading with a small member. The head is typically offset so as to clear the vertical loading member. What is actually desired is an arrangement for mounting a head so as to permit the head to be centered with respect to the contact pad and to allow room on the pad for preamplification units.

Accordingly, a primary object of the present invention is to provide a head mounting arrangement which will allow the head to assume the same plane as the surface of the disc.

It is another object of the invention to provide an arrangement for mounting the head in the center of the contact pad.

It is a further object of the invention to provide a mounting arrangement which will apply a load on the head which is normal to the surface of the rotating disc.

Other objects and advantages of the present invention will be obvious from the detailed description of a preferred embodiment given hereinbelow.

SUMMARY OF THE INVENTION

The aforementioned objects are realized by the present invention which comprises a diaphram spring and rigid frame combination. The diaphram spring is shaped like and functions as a standard gimbal spring to permit rotation in one dimension. The rigid frame is registered with respect to the gimbal spring and both are mounted to the arm via a tab which permits rotation in a second dimension.

DESCRIPTION OF THE DRAWINGS

FIG. 1 shows a perspective view of a prior art mounting arrangement.

FIG. 2 shows how the head rotates in one dimension when contacting the surface of the rotating disc.

DETAILED DESCRIPTION OF A PREFERRED EMBODIMENT

Figure 3:
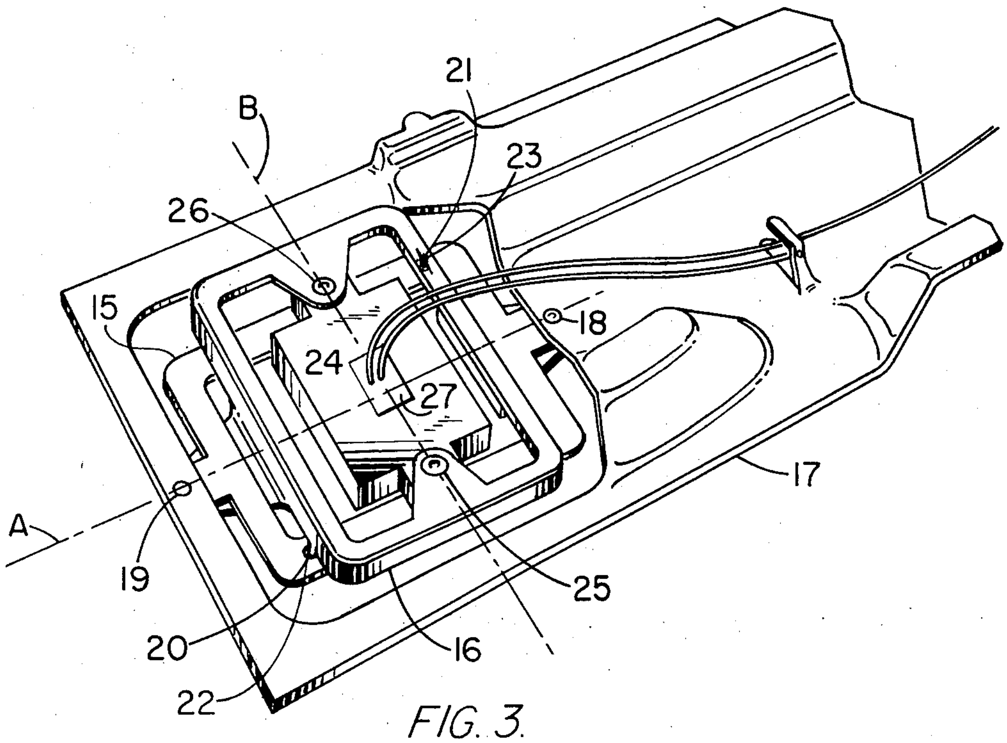
FIG. 3 shows a preferred embodiment of the present invention.

Adverting to the drawings, FIG. 1 shows a typical prior art mounting arrangement. The gimbal spring 1 is attached to the arm 2 at points 3 and 4 and to the pad 5 at points 6 and 7. The head 8 is offset with respect to the pad 5 at its roll center 10 in order to assert a force normal to the surface of the disc. When in operation, the pad 5 rides on a thin film of air which is sustained when the head is brought to the surface of the rotating disc 11. As shown in FIG. 2, the pad 5 must be brought to the disc at a slight angle in order to prevent it from gouging the disc. The rounded surface 12 and bleed holes 13 functioning to effect the proper aerodynamic relationships which must be maintained for ideal recording characteristics. Because of irregularities on the surface 14 of the disc, the pad 5 must be pushed against the disc 11 so that it can rise and fall with a response sufficient to prevent data loss. This force is applied by the member 9 which presses down upon the pad at its roll center 10 leaving the pad 5 free to assume essentially the same plane as the disk 11 as a consequence of the aerodynamic forces acting on it.

FIG. 3 shows a preferred embodiment of the present invention which comprises a gimbal spring 15 which is attached to the arm 17 at points 18 and 19 and a frame 16 pivotally abutting points 18 and 19. The frame 16 itself is registered with respect to the gimbal spring 15 by the projections 20 and 21 which fit into accordant holes 22 and 23 in the gimbal spring. The gimbal spring 15 is attached to the pad 24 at the points 25 and 26. The gimbal spring 15 is thus free to flex so as to permit rotation about either axis A or B whereas the frame 16 can exert a force normal to the surface of the disc through the contact points 25, 26, 18, and 19. In essence, the frame 16 and spring 25 form a hybrid gimbal arrangement which accurately positions the pad 24 and enables it to assume an orientation which is parallel with the disc. This configuration has a higher load carrying capacity and eliminates the requirement for a central load carrying structural member and projecting bearing. The head 27 can be mounted in the center of the pad 24 as shown.

The basic concept of the invention is not limited to disc drives. It is equally applicable to other types of recording equipment. Thus, although a particular application of a preferred embodiment has been shown and illustrated, the invention is not limited thereto — and it will be understood that numerous changes and modifications may be made without departing from the spirit of the invention.

I claim:

1. A mounting arrangement for a disk file head comprising:

a gimbal spring having a pair of oppositely disposed outwardly projecting tabs defining a first axis of rotation and a pair of oppositely disposed (inwardly projecting tabs) pad mounting stations defining a second axis of rotation at right angles to the first axis of rotation;

a frame member having a pair of oppositely disposed outwardly projecting tabs and a pair of oppositely disposed inwardly projecting tabs;

means for attaching the outwardly projecting tabs of said gimbal spring to the recording arm of a disk file;

a pad;

means for attaching (the inwardly projecting tabs of said gimbal spring to said pad) said pad to said mounting stations; whereby said pad is free to rotate about an axis through (the inwardly projecting tabs) the mounting stations of said gimbal spring or the outwardly projecting tabs of said gimbal spring.

2. The arrangement recited in claim 1 wherein is included means for registering said frame with said gimbal spring.

3. The arrangement recited in claim 2 wherein the inwardly projecting tabs of said frame are positioned to contact said pad whereby a normal force can be asserted upon the disk by the inwardly projecting frame tabs.

4. A mounting arrangement for a disk file head of the type having a recording arm to which is attached a gimbal spring which allows two-dimensional rotation of a pad upon which said head is mounted, wherein the improvement comprises:

a frame member;

projection means attached to said frame member for applying a force to said pad in a direction normal to the axes about which said pad is free to rotate;

means for pivotally abutting said frame member against said recording arm.

5. The apparatus recited in claim 4 wherein said frame member is registered with respect to said gimbal spring.

* * * * *